3,391,187
PURIFICATION OF MALIC ACID
Matthew A. Cullen, Jr., and Milton R. Ingleman, Hamburg, N.Y., assignors to Allied Chemical Corporation, New York, N.Y., a corporation of New York
Filed Jan. 13, 1966, Ser. No. 520,477
7 Claims. (Cl. 260—535)

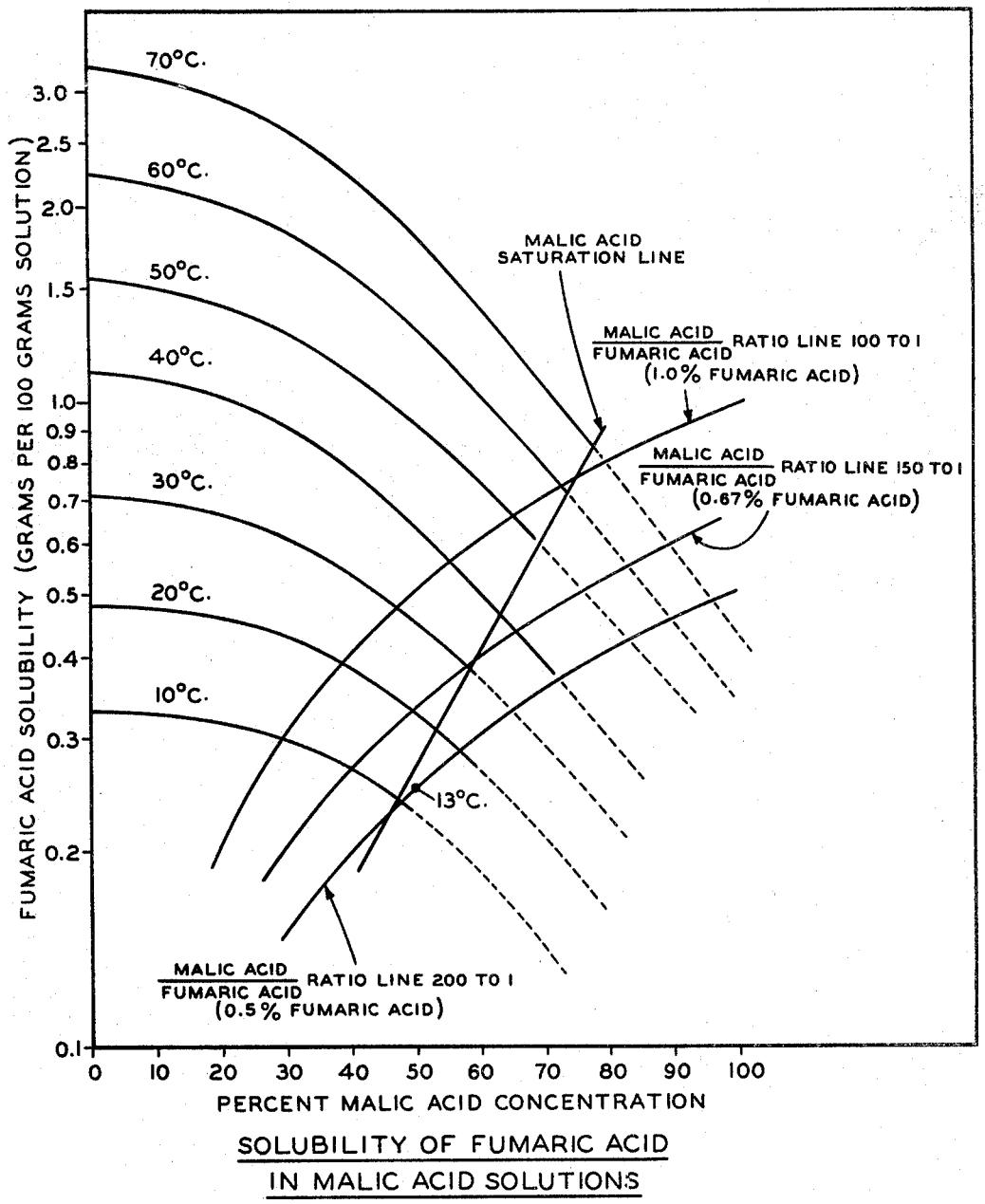

This application is a continuation-in-part of our copending U.S. application Ser. No. 426,367 filed Jan. 18, 1965, now abandoned. This invention relates to the purification of malic acid. More particularly it relates to the preparation of malic acid substantially free from maleic and/or fumaric acids.

The chemical synthesis of d,l-malic acid is well known. In addition to the direct conversion of maleic acid to malic acid this synthesis is believed to proceed in two steps, the first being the insomerization of maleic acid to fumaric acid, which is then hydrated to malic acid. These reactions are generally carried out in aqueous solutions at elevated temperatures, i.e., above about 150° C., and under superatmospheric pressures, i.e., above about 10 atmospheres. The product of this reaction is an equilibrium mixture of maleic, fumaric and malic acids comprising approximately 60 to 40% malic acid, 40 to 60% fumaric acid and small amounts usually less than about 2 to 3% of maleic acid, higher reaction temperatures favoring the conversion to malic acid. Although the greater portion of the fumaric acid can be separated from the reaction product by crystallization in view of the low solubility of fumaric acid in aqueous media, the complete removal of fumaric acid from the malic acid product is complicated by the reversible character of the hydration reaction. Thus, attempts to completely remove fumaric acid from mixtures thereof with malic acid by recrystallization from hot aqueous solutions are not feasible in view of the significant rate of the reaction:

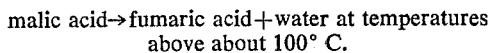
malic acid → fumaric acid + water at temperatures above about 100° C.

Methods heretofore practiced for purification of malic acid are generally tedious, expensive, and usually incur substantial losses of the desired malic acid. According to one method, malic acid is separated from minor amounts of fumaric and maleic acids by conversion of these acids to their calcium salts. Calcium malate precipitates and is filtered from the mother liquor containing most of the fumaric and maleic acids as well as a not inconsiderable quantity (about 15 to 20%) of the malic acid. Thereafter, the isolated calcium salt is digested with aqueous sulfuric acid, and after removal of the precipitated calcium sulfate and excess sulfate ions by addition of barium carbonate and oxalic acid, the malic acid is recovered from the mother liquor by evaporation and crystallization. As can be seen, such a purification procedure is time consuming, costly and only relatively effective.

It is, therefore, a principal object of this invention to provide an effective and economical process for the purification of malic acid.

Another object is to provide an effective process for the preparation of malic acid substantially free of maleic and fumaric acids.

Still another object is to provide an effective and economical process for the preparation of malic acid suitable for human consumption.

Other objects will be apparent from the following description of our invention.

In accordance with the present invention, we have discovered that malic acid containing less than 500 p.p.m. of maleic acid and less than 7500 p.p.m. of fumaric acid can be efficiently and economically obtained from crude malic acid, i.e., malic acid containing substantial amounts of maleic and fumaric acids such as that obtained by the hydration of maleic and/or fumaric acids, by a process which is described briefly as a controlled two stage crystallization of malic acid at temperatures of at least 40° C. and preferably below 70° C. by concentrating an aqueous solution of the acid, removing solid fumaric acid, crystallizing malic acid, redissolving malic acid, concentrating the solution, removing additional fumaric acid and recrystallizing malic acid to receive a purer product.

More specifically, the process comprises the steps of:

(a) adjusting an aqueous solution of malic acid at a temperature of at least 40° C. to a malic acid concentration of at least about 40% by weight;

(b) preferably, cooling the solution to a temperature of about 0 to 50° C., preferably to 15° C., and maintaining the solution at this temperature until equilibrium of the mixture is reached;

(c) separating solid fumaric acid from the slurry, preferably by filtration;

(d) concentrating the mother liquor from step (c) at a temperature of at least 40° C., to a malic acid concentration of at least about 62% by weight;

(e) maintaining this temperature to effect crystallization of malic acid;

(f) separating solid malic acid from the resultant slurry at a temperature of at least about 40° C.;

(g) preferably, washing the malic acid with at least 25% of its weight of an aqueous solution substantially free from maleic and fumaric acids;

(h) redissolving the washed malic acid crystals in about an equal weight of water;

(i) removing insolubles, principally fumaric acid, preferably by filtration;

(j) preferably, passing the resultant solution through a carbon column to remove color impurities;

(k) adjusting the resultant solution to a malic acid concentration of at least about 62% by weight at a temperature of at least 40° C.;

(l) maintaining the resultant solution at a temperature of at least about 40° C. to cause crystallization of malic acid;

(m) separating solid malic acid at a temperature of at least about 40 C.; and (n) washing the solid malic acid with at least 25% by weight of an aqueous solution substantially free from maleic and fumaric acids to obtain a purified malic acid containing not over about 500 p.p.m. of maleic acid and not over about 7500 p.p.m. of fumaric acid.

The effectiveness of this novel purification procedure is based on a surprising discovery which was made during the course of our investigations. We have found that the dehydration of malic acid to fumaric acids at temperatures below 100° C. is much slower than the extrapolated values estimated from the reaction rates for this reaction at temperatures within the range of 180° to 220° C. As a result of this fortuitous discovery, solutions of malic acid can be held for relatively long periods at temperatures below 100° C. without significant conversion of malic acid to fumaric acid.

The crude malic acid liquor obtained from the reactor is concentrated at a temperature of about 40° C. under reduced pressure, and until the malic acid concentration of the solution is between about 40 and 70% by weight. The solution is preferably cooled to a temperature within the range of 0° to 50° C., which temperature is not lower than 15° below nor higher than 10° above the saturation temperature of malic acid in the liquid phase of the mixture, and in maintained at this temperature until equilibrium is reached, after which solid fumaric acid is removed, preferably by filtration.

After separating the fumaric acid crystallized at this stage, the mother liquor is further concentrated preferably at 45 to 50° C. under reduced pressure, until the malic acid concentration is preferably about 65 to 70% by weight. The resultant solution is then agitated at about 45 to 50° C., care being taken to prevent further evaporation, and when the crystallization of the malic acid has been completed, usually 2 to 3 hours being adequate, the crystals are separated. These wet malic acid crystals may contain a significant quantity of fumaric acid, about 1 to 2%. Preferably, the malic acid crystals are washed with an aqueous solution, e.g., water or especially a saturated aqueous malic acid solution, at a temperature above about 40° C., and preferably at about 45 to 50° C., to remove fumaric acid and maleic acid from the malic acid crystals. This washing step is conveniently and efficiently carried out by reslurrying the malic acid crystals in the malic acid solution. Preferably, about equal parts by weight of wash liquor and malic acid crystals are used, although amounts of wash liquor ranging from 25 to 500% by weight of the solid malic acid being washed can be used.

The malic acid crystals even after washing may still contain significant amounts (up to about 1% by weight) of fumaric acid. These crystals are dissolved in an aqueous solution, e.g. aqueous malic acid wash liquor which is substantially free from maleic and fumaric acid or water. Preferably, the crystals are dissolved in about an equal weight of water. Due to the negative heat of solution of malic acid, the resulting solution is obtained at a temperature of about 14 to 17° C. Insolubles, principally fumaric acid, are then removed by filtration. If the crystals thus dissolved contain an appreciable amount of color, the solution can be passed through an activated carbon column at this point. The clarified solution is then concentrated by heating at above about 40° C. and preferably at about 50° C. under reduced pressure, until the malic acid concentration, is at least about 62% by weight and preferably about 70% by weight. Concentration of the solution of malic acid should be performed at a temperature below 70° C., above which the self condensation of malic acid forming malomalic acid occurs at a significant rate. The mass is them permitted to stand at a temperature of at least 40° C. and preferably at about 50° C., i.e. approximately that temperature at which the concentration of the malic acid solution was effected, for a period of time sufficient to complete the crystallization of the malic acid from the mass, usually 1 to 3 hours. Alternatively, the malic acid crystals may be dissolved in hot water to provide concentration and the resulting solution cooled to crystallize malic acid. To minimize contaminating the malic acid crystals with fumaric and maleic acids the crystallization is carried out at a temperature of at least about 40° C., and preferably about 50° C.

Under these conditions of temperature, the maximum solubility of fumaric acid is not exceeded. The maximum solubility of fumaric acid is about 0.6% by weight within the range of concentration of 70% malic acid solution at 50° C., 80% malic acid solution at 60° C. and 90% malic acid solution at 70° C. whereas the maximum solubility of malic acid (i.e. saturated solution) at 50° C. is about 69%, at 60° C. about 75% and at 70° C. about 78%. Therefore, under these conditions contamination of malic acid is kept at a minimum. The crystals are separated from the slurry, e.g., by centrifuging the mass. The isolated crystals of malic acid may, at this point, contain about 0.05% of maleic acid and less than about 1% of fumaric acid. The said crystals are washed, preferably by reslurrying, with at least 25%, and preferably about 100%, of their weight of a warm (about 50° C.) aqueous solution, e.g., water or preferably saturated malic acid, substantially free from maleic and fumaric acids. This final wash reduces the maleic acid content of the crystals to below 500 p.p.m. (0.05%) and the fumaric acid content to below 7500 p.p.m. (0.75%). The washed crystals are dried in any convenient manner.

The above description describes the manner, including the preferred mode, of carrying out this novel process batchwise. It is possible to operate this procedure in a continuous manner.

In such a procedure, the crude malic acid solution emanating continuously from the reactor is run into a fumaric acid crystallizer operated at about 50° C. and mixed therein with a portion of the mother liquor from the first stage malic acid crystallizer. The mixture is continuously evaporated to obtain a slurry of fumaric acid which is centrifuged to separate the fumaric acid (which is recycled to the reactor) and a mother liquor containing about 60% malic acid, about 5.5% maleic acid and about 0.6 to 0.7% fumaric acid. The fumaric acid crystals are washed with a portion of the mother liquor obtained from the second stage malic acid crystallizer, the washings being then fed into the fumaric acid crystallizer.

The mother liquor obtained after separation of the fumaric acid is fed into the first stage malic acid crystallizer operated at about 50° C. This mother liquor, admixed with a portion of the mother liquor obtained from the second stage malic acid crystallizer (which is first used as wash liquor for the malic acid crystals obtained in this step), is evaporated to obtain a slurry of malic acid and a mother liquor containing about 70% malic acid, about 8.0% maleic acid and about 1.0% fumaric acid. The slurry is centrifuged to remove solid malic acid and the mother liquor is split, the major portion being returned to the fumaric acid crystallizer and the minor proportion being admixed with fresh maleic acid and recycled fumaric acid to make up the reactor charge.

The washed malic acid is dissolved in water, or aqueous malic acid obtained by dissolving fines recovered from the malic acid product below is centrifuged to remove insolubles, principally fumaric acid, and the resulting solution is fed to the second stage evaporator operated at about 50° C. The slurry obtained at this point consists of about 20% solids and is centrifuged to yield malic acid crystals and a mother liquor containing about 67.0% malic acid and about 0.1% maleic acid. The crystals are washed with saturated malic acid solution containing substantially no maleic or fumaric acid and the mother liquor and wash liquor recycled as wash liquors for the fumaric acid crystals and the first stage malic acid crystals. The washed malic acid crystals obtained from the second stage evaporator are fed to a drier, sifted to remove fines and then packed out, as a free flowing noncaking crystalline product containing less than 100 p.p.m. of maleic acid and less than 7500 p.p.m. of fumaric acid.

The washing of the crystals obtained at several stages of our process is an important operation for the success of the process. Although water can be used, it is the least desirable wash liquor since it removes not only maleic and fumaric acids but also dissolves significant amounts of malic acid. Preferably saturated aqueous malic acid is used and the washing is carried out at about the same temperature as the preceding concentration and crystallization step. The washing step can be effected by means of the usual displacement technique but we have found it to be somewhat more effective and hence we prefer to carry out this operation by reslurrying the crystal magma in the wash liquor and then separating the washed crystals from the slurry by conventional means, e.g., filtration and centrifugation.

The liquor obtained in these washing procedures can be used to wash the crystals obtained in a preceding crystallization stage, i.e., the wash liquor obtained in the final stage can be used to wash crystals obtained in the first stage, or these liquors can be used to dissolve the washed crystals obtained in the first stage malic acid crystallization. Similarly the liquor obtained in the first stage washing step can be used to wash the fumaric acid crystals separated at the first steps of the process. For washing and dissolving malic acid crystals it is important to use liquors which contain a lesser amount of maleic and fumaric acids than the crystals to be washed and/or dissolved.

The following examples will illustrate the process of our invention. Parts and percentages are by weight and temperatures are in degrees centigrade.

Example 1

A crude malic acid solution obtained by heating a 50% aqueous maleic acid at between 180° to 190° and autogenous pressure for about four hours was cooled to about 130° and fed continuously into an evaporator maintained at 45° to 50° and about 57 mm. (pressure of mercury). The slurry emanating from the evaporator had the following approximate composition:

|  | Percent |
|---|---|
| Water | 35–40 |
| Malic acid | 30–40 |
| Fumaric acid | 30–35 |
| Maleic acid | 1–2 |

This slurry was filtered at about 47° to remove solid fumaric acid which after washing was recycled to the reactor for conversion to crude malic acid. Alternatively, the fumaric acid may be recrystallized from water to yield high grade fumaric acid.

The filtrate from this step had the following approximate composition:

|  | Percent |
|---|---|
| Malic acid | 40–50 |
| Fumaric acid | 1–2 |
| Maleic acid | 1.5–2 |

The filtrate was fed continuously to an evaporator wherein water was removed at about 55° to 60° and 57 mm. to yield a concentrate having a total acid strength (as malic acid) of between about 86 to 90%. This slurry, comprising about 30 to 40% solids was directed to a continuous centrifuge. The mother liquor emanating from the centrifuge had a total acidity of about 77 to 82% and contained about 1% fumaric acid and about 8 to 10% maleic acid. A portion of this liquor is recycled to the reactor and a portion to the evaporator from which it was obtained.

The centrifuge cake was washed with deionized water and the washed cake which contained about 98 to 99% solids of which 3 to 4% was fumaric acid and 0.5 to 1% was maleic acid was dissolved in about an equal weight of cold water. The resulting solution, due in part to the negative heat of solution of malic acid had a temperature of about 14° to 17°, contained insolubles, principally fumaric acid. These were removed by filtration. The filtrate obtained had an approximate composition of:

|  | Percent |
|---|---|
| Malic acid | about 50 |
| Fumaric acid | 0.3–0.4 |
| Maleic acid | 0.3–0.5 |

This filtrate was passed through a polishing filter and then through a bed of decolorizing charcoal. The decolorized solution was clarified by passage through a filter and then into an evaporator maintained at 45° to 50° and about 55 mm. Water is removed from this solution to produce a slurry containing 30 to 40% solids which were removed by passing the slurry into a centrifuge. The filtrate from this centrifuge had the following approximate composition:

|  | Percent |
|---|---|
| Malic acid | 67–70 |
| Fumaric acid | about 1 |
| Maleic acid | 1–2 |

A portion of the filtrate is recycled to the evaporator from which it was obtained and the balance to the first stage malic acid evaporator.

The centrifuge cake was washed with water, dried and screened.

The resulting recrystallized malic acid had the following approximate composition:

|  | P.p.m. |
|---|---|
| 40 to 80 mesh: |  |
| Fumaric acid | 5,000–6,000 |
| Maleic acid | <500 |
| 8 to 40 mesh: |  |
| Fumaric acid | 3,500–4,000 |
| Maleic acid | <500 |
| 100% through 80 mesh: |  |
| Fumaric acid | about 10,000 |
| Maleic acid | <5,000 |

The last portion (the "fines") of the product was returned to the process for reworking.

Example 2

The procedure of the above example was repeated with the exceptions that the slurry which emanated from the first evaporator was cooled to about 15° prior to filtration of the fumaric acid. The filtrate obtained in this manner had the following composition.

|  | Percent |
|---|---|
| Malic acid | 50–55 |
| Fumaric acid | about 0.35 |
| Maleic acid | 3–4 |

The crude malic acid cake obtained by concentration of the above liquor contained about 0.2 to 0.3% of both fumaric and maleic acids.

The crude malic acid was dissolved in sufficient water to produce a 70% aqueous malic acid solution. After filtration, decolorization, evaporation and crystallization, a malic acid product containing between 1000 and 3000 p.p.m. of fumaric acid was obtained.

The following examples follow the procedure outlined in the above examples but further illustrate the effect of cooling the mixture prior to filtration and also the effect of the concentration of malic acid solution on the purification process:

Example 3

A mixture of malic acid, fumaric acid, maleic acid and water was stirred at 45° C. for two hours and filtered to separate solid fumaric acid comprising about 20% of the total mixture. The filtrate was separated and was shown by analysis to contain per 100 parts,

|  | Parts |
|---|---|
| Malic acid | 63.7 |
| Fumaric acid | 0.64–0.68 |
| Maleic acid | 1.09 |

1500 parts of the filtrate were agitated and heated to 60° C. (in vacuo, adjusting the vacuum so that the temperature was maintained at 60° C.) while distilling off 353 parts water. During the distillation, malic acid crystallized out to form a magma of crystals and liquid. The mass weighed 1147 parts. A portion of the mass, 597 parts was centrifuged at 60° C. and whizzed until no more liquid drained from the crystals. The cake weighed 308 parts and contained 96.9 parts of maleic acid, 0.77 part of fumaric acid, and 0.14 part of maleic acid per 100 parts. The mother liquor, 287 parts contained per 100 parts,

|  | Parts |
|---|---|
| Malic | 70.7 |
| Fumaric | 1.09 |
| Maleic | 2.53 |

Example 4

A similar mixture was treated in the same way except that the mixture was cooled to 30° C. before filtration of fumaric acid. The filtrate was shown to contain per 100 parts,

|  | Parts |
|---|---|
| Malic | 63.1 |
| Fumaric | 0.495 |
| Maleic | 1.08 |

1000 parts of the filtrate was treated in a manner similar to Example 2 to remove 240 parts water at 60° C. 518 parts of the magma were centrifuged as above to give 290 parts of cake contained per 100 parts,

| | Parts |
|---|---|
| Malic | 96.9 |
| Fumaric | 0.22 |
| Maleic | 0.31 | and 233 parts of mother liquor which contained per 100 parts,

| | Parts |
|---|---|
| Malic | 77.8 |
| Fumaric | 1.20 |
| Maleic | 2.88 |

Example 5

The same procedure was repeated except that water of dilution, 570 parts per 2500 parts of mixture was added, and the mixture was cooled to 13° C. prior to filtration of fumaric acid. The filtrate contained per 100 parts,

| | Parts |
|---|---|
| Malic | 48.4 |
| Fumaric | 0.336 |
| Maleic | 0.86 |

1330 parts of the filtrate were evaporated as in Example 3 to remove 527 parts of water leaving 773 parts of crystal magma. 506 parts of the magma were centrifuged to yield, 281 g. crystals which contained per 100 parts:

| | Parts |
|---|---|
| Malic | 98.5 |
| Fumaric | 0.36 |
| Maleic | 0.19 | and 213 parts of mother liquor containing per 100 parts:

| | Parts |
|---|---|
| Malic | 71.7 |
| Fumaric | 0.93 |
| Maleic | 3.17 |

Example 6

The procedure of Example 5 was repeated except only about 505 parts of water were distilled to yield 795 parts of magma. 499 parts of the magma were centrifuged to give 274 parts of cake containing per 100 parts:

| | Parts |
|---|---|
| Malic | 98.9 |
| Fumaric | 0.15 |
| Maleic | 0.22 | and 226 parts of mother liquor containing per 100 parts

| | Parts |
|---|---|
| Malic | 71.8 |
| Fumaric | 0.88 |
| Maleic | 2.98 |

Example 7

When the procedure of Example 5 was repeated except that the mixture was cooled to 0° C. prior to filtration of fumaric acid, the filtrate contained per 100 parts:

| | Parts |
|---|---|
| Malic | 49 |
| Fumaric | 0.29 |
| Maleic | 0.88 |

1330 parts filtrate evaporated in the same manner to remove 537 parts of water to yield a magma of 763 parts. 519 parts were centrifuged to give 294 parts cake containing:

| | Parts |
|---|---|
| Malic | 97.95 |
| Fumaric | 0.19 |
| Maleic | 0.20 |

215 parts mother liquor containing:

| | Parts |
|---|---|
| Malic | 72.7 |
| Fumaric | 1.23 |
| Maleic | 3.12 |

It can thus be seen that an efficient and economical process for the purification of crude malic acid has been devised. It can further be seen that this procedure provides malic acid of relatively low contamination by maleic and fumaric acids and thus is eminently suited for use in compositions intended for human consumption.

Our invention has been described and illustrated by reference to a specific embodiment thereof. While the illustrative example include our preferred procedure, it should be noted that variations in this procedure are feasible and many such variations will be obvious to those skilled in this art in view of the disclosures contained herein.

Wherein the above description and in the appended claims, the term "maintaining the solution until equilibrium of the mixture is reached" it is intended that this phrase shall imply that the crystallization of fumaric acid from the mixture of malic, maleic and fumaric acids has proceeded to the point where essentially all of the fumaric acid which will crystallize from this mixture has precipitated from solution at the temperature to which the mixture has been cooled and is being maintained, and consequently the mother liquor is essentially saturated with respect to fumaric acid at the prevailing temperature.

We claim:

1. The process of purifying crude malic acid containing substantial amounts of maleic and fumaric acids which comprises the steps of
    (a) adjusting an aqueous solution of malic acid at a temperature of at least 40° C. to a malic acid concentration of at least about 40% by weight;
    (b) separating solid fumaric acid from the resulting slurry;
    (c) concentrating the mother liquor from step (b) at a temperature of at least 40° C. to a malic acid concentration of at least 62% by weight to effect crystallization of malic acid;
    (d) separating malic acid from the resultant slurry;
    (e) redissolving the malic acid crystals in water;
    (f) separating insolubles from the resulting solution;
    (g) adjusting the resultant solution to a malic acid concentration of at least 62% by weight at a temperature of at least 40° C. to effect crystallization of malic acid;
    (h) separating solid malic acid at a temperature of at least 40° C. and
    (i) washing the solid malic acid with at least 25% by weight of an aqueous solution substantially free from maleic and fumaric acids to obtain a purified malic acid containing not over about 500 p.p.m. of maleic acid and not over about 7500 p.p.m. of fumaric acid.

2. The process of claim 1 wherein the solution obtained in step (f) is passed through a carbon column to remove color impurities prior to performing step (g).

3. The process of purifying crude malic acid containing substantial amounts of maleic and fumaric acids which comprises the steps of
    (a) adjusting an aqueous solution of malic acid at a temperature of about 45 to 50° C. to a malic acid concentration of about 50% by weight;
    (b) cooling the solution to a temperature of about 15° C. and maintaining the solution at this temperature until equilibrium is reached;
    (c) separating solid fumaric acid from the resulting slurry;
    (d) concentrating the mother liquor resulting from step (c) at a temperature of about 45 to 50° C. to a malic acid concentration of at least about 65%;

(e) maintaining this temperature to effect crystallization of malic acid;
(f) separating solid malic acid from the resulting slurry at a temperature of about 45 to 50° C.;
(g) washing the malic acid with at least 25% of its weight of an aqueous solution substantially free from maleic and fumaric acids;
(h) redissolving the washed malic acid crystals in about an equal weight of water;
(i) passing the resulting solution through a carbon column to remove color impurities;
(j) adjusting the resulting solutions to a malic acid concentration of at least about 65% by weight at a temperature of about 45 to 50° C.;
(k) maintaining this temperature to effect crystallization of malic acid;
(l) separating solid malic acid at a temperature of about 45 to 50° C.; and
(m) washing the solid malic acid with at least 25% by weight of an aqueous solution substantially free from maleic and fumaric acids to obtain a purifide malic acid containing not over about 500 p.p.m. of maleic acid and not over 7500 p.p.m. of fumaric acid.

4. The process of purifying crude malic acid containing substantial amounts of maleic and fumaric acids which comprises the steps of
(a) adjusting a crude aqueous solution of malic acid to a malic acid concentration of at least about 40% and not substantially in excess of 70% by weight at a temperature within the range of about 0° and 50° C., said temperature being not lower than 15° C. below and not higher than 10° C. above the saturation temperature of malic acid in the liquid phase; and maintaining the solution at this temperature until equilibrium is reached;
(b) separating solid fumaric acid from the resulting slurry;
(c) concentrating the mother liquor obtained in step (b) and recovering a purified malic acid containing not over about 500 p.p.m. of maleic acid and not over about 7500 p.p.m. of fumaric acid.

5. The process of claim 4 wherein said aqueous solution in step (a) is adjusted at a temperature of about 40 to about 50° C. to a malic acid concentration of about 50%.

6. The process of claim 4 wherein the solution of step (a) is cooled to about 15°C. prior to performing step (b).

7. The process of purifying crude malic acid containing substantial amounts of maleic and fumaric acids which comprises the steps of
(a) adjusting a crude aqueous solution of malic acid to a malic acid concentration of at least about 40% and not substantially in excess of 70% by weight at a temperature within the range of about 0° and 50° C., said temperature being not lower than 15° C. below and not higher than 10° C. above the saturation temperature of malic acid in the liquid phase;
(b) separating solid fumaric acid from the resulting slurry;
(c) concentrating the mother liquor from step (b) at a temperature of at least 40° C. to an acid concentration, calculated as malic acid, of at least 62% by weight to effect crystallization of malic acid;
(d) separating malic acid from the resultant slurry;
(e) redissolving the malic acid crystals in water;
(f) adjusting the resultant solution to an acid concentration of at least 62% by weight calculated as malic acid at a temperature of at least 40° C. to effect crystallization of malic acid;
(g) separating solid malic acid at a temperature of at least 40° C.; and
(h) washing the solid malic acid with at least 25% by weight of an aqueous solution substantially free from maleic and fumaric acids to obtain a purified malic acid containing not over about 500 p.p.m. of maleic acid and not over about 7500 p.p.m. of fumaric acid.

References Cited

FOREIGN PATENTS 476,109  11/1937  Great Britain.

OTHER REFERENCES

Weiss et al., J.A.C.S., vol. 44 (1922), pp. 1118–1125.

LORRAINE A. WEINBERGER, *Primary Examiner.*

A. P. HALLUIN, *Assistant Examiner.*